United States Patent
Suzuki et al.

[11] Patent Number: 6,151,095
[45] Date of Patent: Nov. 21, 2000

[54] ANTI-FERROELECTRIC LIQUID CRYSTAL CELL

[75] Inventors: Yasushi Suzuki; Akira Suguro, both of Tokorozawa; Tomoyuki Yui, Tsukuba; Masahiro Johno, Tsukuba; Takahiro Matsumoto, Tsukuba, all of Japan

[73] Assignees: Citizen Watch Co., Ltd.; Mitsubishi Gas Chemical Company, Inc., both of Tokyo, Japan

[21] Appl. No.: 09/194,203

[22] PCT Filed: Mar. 19, 1998

[86] PCT No.: PCT/JP98/01195

§ 371 Date: Nov. 20, 1998

§ 102(e) Date: Nov. 20, 1998

[87] PCT Pub. No.: WO98/42801

PCT Pub. Date: Oct. 1, 1998

[30] Foreign Application Priority Data

Mar. 24, 1997 [JP] Japan .................................. 9-070135

[51] Int. Cl.$^7$ .......................... C09K 19/12; C09K 19/20; C09K 19/02

[52] U.S. Cl. .................. 349/182; 349/174; 252/299.66; 252/299.67

[58] Field of Search .......................... 252/299.66, 299.67; 349/174, 182

[56] References Cited

U.S. PATENT DOCUMENTS

| | | | |
|---|---|---|---|
| 5,660,762 | 8/1997 | Ito et al. | 252/299.67 |
| 5,716,544 | 2/1998 | Motoyama et al. | 252/299.65 |
| 5,820,782 | 10/1998 | Yamada et al. | 252/299.61 |
| 5,840,209 | 11/1998 | Mineta et al. | 252/299.67 |
| 5,938,973 | 8/1999 | Motoyama et al. | 252/299.65 |
| 5,951,914 | 9/1999 | Matsumoto et al. | 252/299.67 |
| 5,968,413 | 10/1999 | Mine et al. | 252/299.65 |
| 5,980,780 | 11/1999 | Motoyama et al. | 252/299.64 |
| 5,985,172 | 11/1999 | Motoyama et al. | 252/299.64 |
| 6,001,278 | 12/1999 | Matsumoto et al. | 252/299.65 |

FOREIGN PATENT DOCUMENTS

| | | |
|---|---|---|
| 8-253768 | 10/1996 | Japan . |
| 10-53765 | 2/1998 | Japan . |
| 10-121046 | 5/1998 | Japan . |

*Primary Examiner*—C. H. Kelly
*Attorney, Agent, or Firm*—Finnegan, Henderson, Farabow, Garrett & Dunner, L.L.P.

[57] ABSTRACT

An antiferroelectric liquid crystal cell having a high-speed response and wide viewing angle characteristic free of an image sticking phenomenon is provided. This antiferroelectric liquid crystal cell is composed of an antiferroelectric liquid crystal material held between a pair of parallel substrates. The antiferroelectric liquid crystal material filled between the parallel substrates has such a characteristic that when a sinusoidal voltage value with a changing reference frequency is applied to the antiferroelectric liquid crystal cell, the imaginary part of the complex dielectric constant obtained by Fourier transform of the output voltage value output from the antiferroelectric liquid crystal cell has no local maximum value within the reference frequency range of 100 Hz to 5 kHz. In other words, this characteristic is similar to a characteristic such that when the real part and the imaginary part of the complex dielectric constant are plotted by using a Cole—Cole plot for each frequency, a characteristic curve having no local maximum value within the reference frequency range of 100 Hz to 5 kHz is obtained.

4 Claims, 12 Drawing Sheets

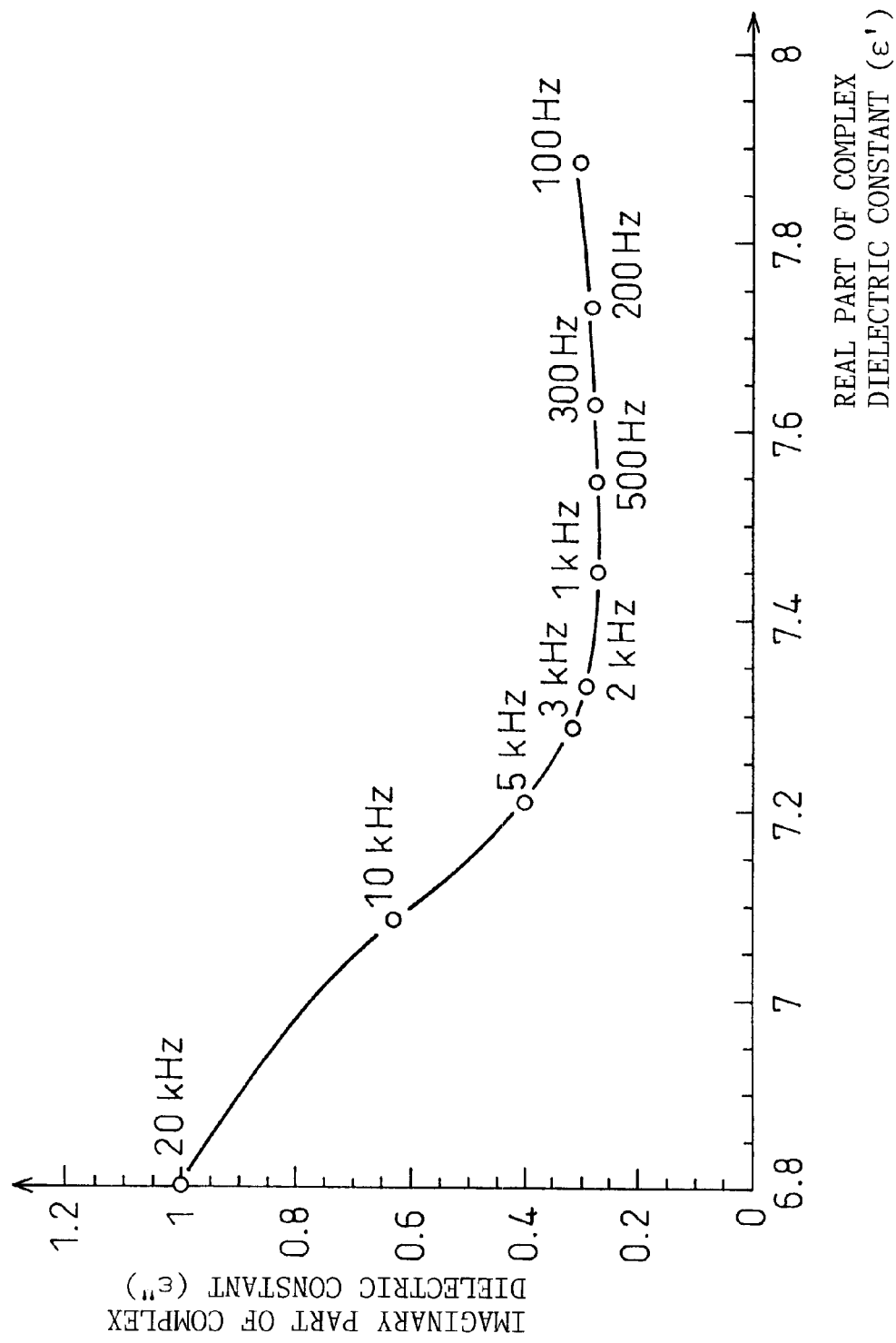

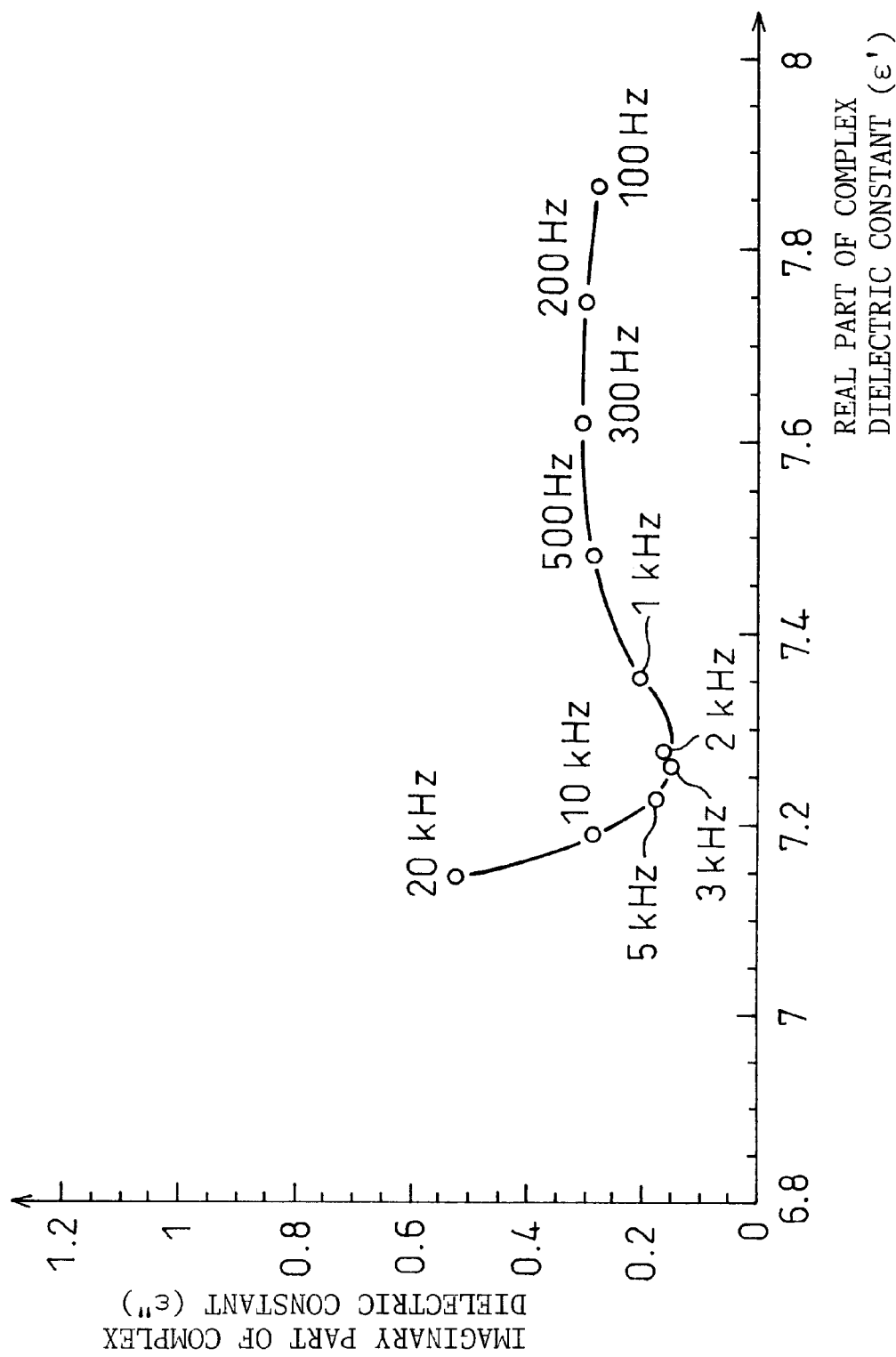

ANTI-FERROELECTRIC LIQUID CRYSTAL CELL

TECHNICAL FIELD

The present invention relates to an antiferroelectric liquid crystal cell or, in particular, to a liquid crystal cell having a satisfactory display quality using an antiferroelectric liquid crystal for a liquid crystal display device, etc.

BACKGROUND ART

The antiferroelectric liquid crystal (AFLC) is known to have a large spontaneous polarization. Spontaneous polarization is one of the features of liquid crystal materials. Also, an antiferroelectric liquid crystal cell holding an antiferroelectric liquid crystal between a pair of substrates is known to have such a structure that the antiferroelectric liquid crystal molecules assume a spatial arrangement, i.e. form layers and cancel the spontaneous polarization Ps between the layers when no voltage is applied thereto. The antiferroelectric liquid crystal material was discovered in 1988 and was initially introduced as a material capable of preventing an image sticking phenomenon, i.e. a phenomenon in which information written previously remains on the liquid crystal panel, as compared with the conventional nematic liquid crystal.

Since then, the antiferroelectric liquid crystal material has been developed to produce a liquid crystal panel taking advantage of this feature. In order to secure a fast response characteristic, a great effort has so far been concentrated on developing an antiferroelectric liquid crystal material having a large spontaneous polarization Ps and a blending technique, with the result that the display characteristic or, mainly the response characteristic, of the liquid crystal display panel using the antiferroelectric liquid crystal was greatly improved.

With the advance of the development of a liquid crystal display panel using an antiferroelectric liquid crystal panel having a satisfactory display characteristic, however, an image sticking phenomenon, which is considered to be due to the layer switching which is one of the features of the antiferroelectric liquid crystal material, appeared. Since then, obviating this phenomenon has become important for the liquid crystal display panel using the antiferroelectric liquid crystal.

In the case where the device using the antiferroelectric liquid crystal cell is driven for display, a method is available in which the antiferroelectric liquid crystal cell is held by a pair of polarizing plates with the polarizing axes set as cross nicols and the polarizing plate is set in such a manner that the polarization axis of one polarizing plate substantially coincides with the direction of the average antiferroelectric liquid crystal molecules in the absence of electric field. Once this polarizing plate is set, an antiferroelectric liquid crystal panel is obtained which is capable of producing a black display in the absence of electric field and producing a white display when a voltage is applied.

On the other hand, as a result of vigorous analysis of the above-mentioned image sticking phenomenon specific to the antiferroelectric liquid crystal, the present inventors have found that there are two types of such a phenomenon, i.e. an image sticking phenomenon caused when black display is newly written in the area where a white display was previously written, and an image sticking phenomenon caused when a white display is newly written in the area where a black display was written. In other words, they are the image sticking phenomenon generated after the antiferroelectric liquid crystal system is held in ferroelectric state, and the image sticking phenomenon generated after the antiferroelectric liquid crystal system is held in antiferroelectric state. The present inventors have discovered that the liquid crystal material property substantially in control of the image sticking phenomena is a dielectric constant characteristic, i.e. the frequency dispersion characteristic.

There is, however, another important problem to be solved while obviating the image sticking phenomenon. It is to provide a superior antiferroelectric liquid crystal display device, i.e. to secure a high-speed response and a wide viewing angle characteristic constituting the features of the antiferroelectric liquid crystal mode.

DISCLOSURE OF THE INVENTION

The object of the present invention is to provide an antiferroelectric liquid crystal cell which secures a high-speed response and a wide viewing angle characteristic while at the same time developing no image sticking phenomenon.

The antiferroelectric liquid crystal cell according to the present invention for achieving the above-mentioned object holds an antiferroelectric liquid crystal material between a pair of substrates, and is characterized by using an antiferroelectric liquid crystal material having such a characteristic that when a sinusoidal voltage is applied to the antiferroelectric liquid crystal cell with a changing reference frequency, the imaginary part of the complex dielectric constant obtained by Fourier transform of the output voltage value output from the antiferroelectric liquid crystal cell has no local maximum value within the reference frequency range of 100 Hz to 5 kHz.

This characteristic is such that when the real part and the imaginary part of the complex dielectric constant are plotted by using a Cole—Cole plot for each reference frequency, a curve is obtained in which no local maximum value exists in the reference frequency range of 100 Hz to 5 kHz.

An antiferroelectric liquid crystal material composed of a mixture of compounds expressed by the following chemical formulae (1), (2), (3) and (4) can be used as an actual antiferroelectric liquid crystal. In this case, the antiferroelectric liquid crystal is preferably composed of a mixture of 52.5 mol % of the compound expressed by (1), 22.5 mol % of the compound expressed by (2), 15 mol % of the compound expressed by (3) and 22.5 mol % of the compound expressed by (4).

(1)

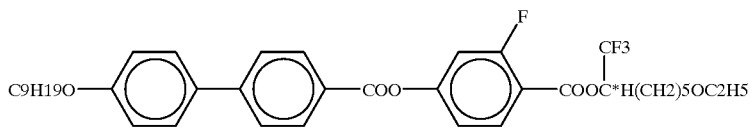

-continued

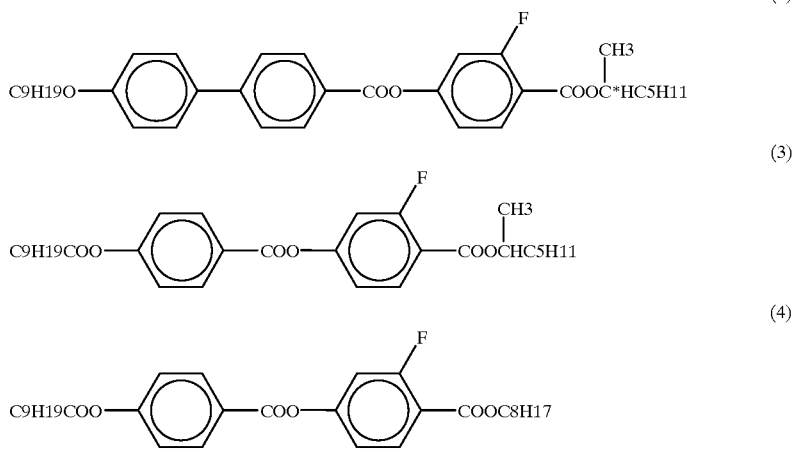

BRIEF DESCRIPTION OF THE DRAWINGS

The above-mentioned and other objects, features, advantages, etc. of the present invention will be explained in detail below in accordance with the embodiments shown in the accompanying drawings in which

FIG. 7 is a Cole—Cole plot diagram corresponding to the frequency of the real part and the imaginary part of the complex dielectric constant obtained in an embodiment of the invention;

FIG. 9 is a Cole—Cole plot diagram corresponding to the frequency of the real part and the imaginary part of the complex dielectric constant obtained by a reference not associated with the present invention;

BEST MODE FOR CARRYING OUT THE INVENTION

Figure 1:
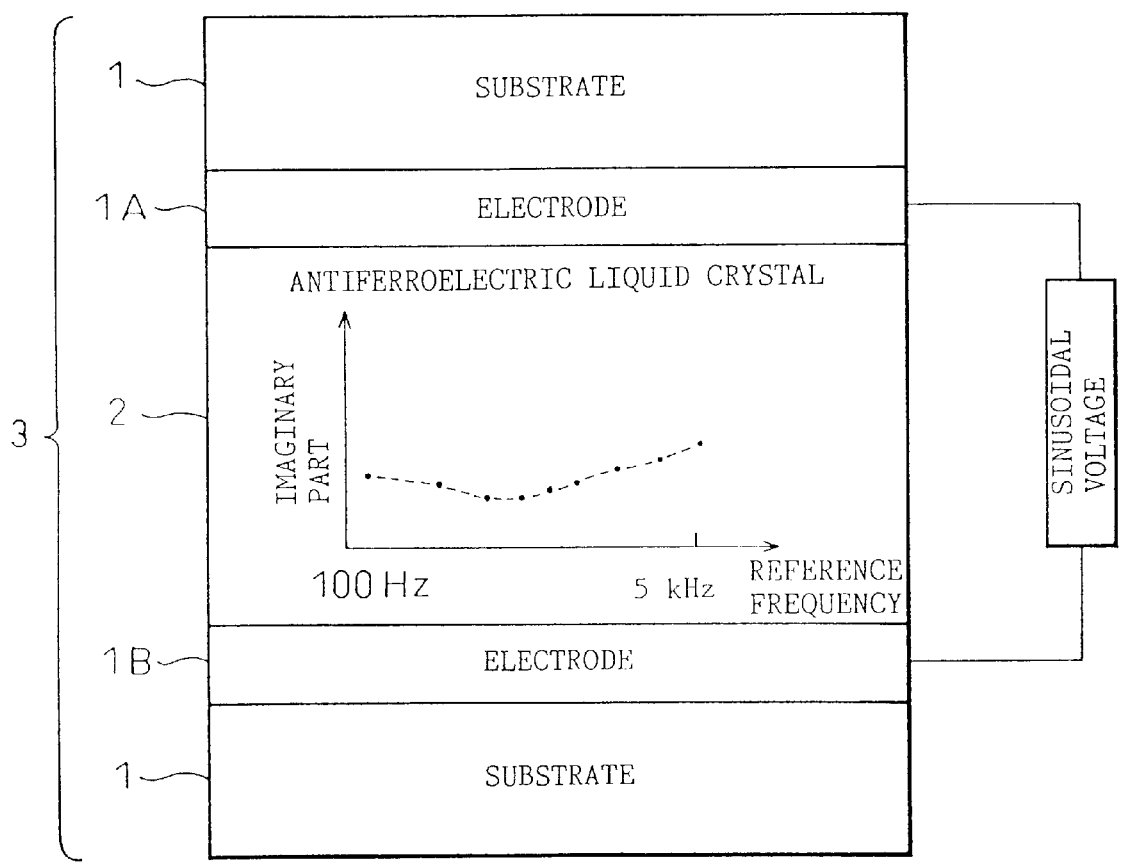
FIG. 1 is a diagram showing a basic configuration of an antiferroelectric liquid crystal cell according to the present invention.

First, a basic configuration of the invention will be explained with reference to FIG. 1. The basic configuration of the invention, as shown in FIG. 1, is an antiferroelectric liquid crystal cell 3 with an antiferroelectric liquid crystal material 2 held between a pair of substrates 1 having electrodes 1A, 1B, respectively. The feature of the invention is that this antiferroelectric liquid crystal material 2 has such a characteristic that the imaginary part of the complex dielectric constant obtained by a Fourier transformation of the output voltage value output from the antiferroelectric liquid crystal cell by applying a sinusoidal voltage with a reference voltage changed between the electrodes 1A, 1B of the antiferroelectric liquid crystal cell 3 has no local maximum value in the reference frequency range of 100 Hz to 5 kHz.

The feature of the drive mode using the antiferroelectric liquid crystal is to use the phase transfer process between (1) the antiferroelectric phase as a stable phase and (2) the ferroelectric phase as a metastable phase. The white write of an antiferroelectric liquid crystal panel is indicative of the phase transfer of a display from the antiferroelectric phase to the ferroelectric phase by voltage application. The antiferroelectric liquid crystal is held for a long time in ferroelectric phase at the risk of inducing the image sticking phenomenon specific to normal ferroelectric phase. A known cause of the image sticking phenomenon of the ferroelectric liquid crystal is that impurity ions are diffused and adsorbed to the alignment layer along the internal electric field attributable to the spontaneous polarization of the liquid crystal molecules, so that the effective write field is not applied. Even when the liquid crystal of antiferroelectric phase is being driven, it is necessary to take, and know the limit of, a measure for preventing the image sticking phenomenon similar to the normal ferroelectric liquid crystal in the white write area affected by the strong electric field.

The parameters for preventing image sticking so far known for a panel using the ferroelectric liquid crystal include the spontaneous polarization Ps and the electric conductivity σ. This invention also is centered on these parameters. In order to find a clear relationship between these parameters for optimizing the materials related to the image sticking phenomenon, the present inventors have measured the dielectric constant including the higher harmonics and determined the mutual relation between the material properties.

The principle of the means for measuring the dielectric constant has been known for a long time. Especially, the cases in which the dielectric constant of the ferroelectric liquid crystal or the antiferroelectric liquid crystal including high harmonic components are analyzed have been reported in many publications (some examples are Jpn. J. Appl. Phys 32, (1993) 4571 Liq. Cryst., 14 (1993) 427: by the group of Kimura and Hayakawa, and J. Phys. Soc. Jpn, 64 (1995) 3188, Solid Physics 31 (1996) 459: by the group of Orihara and Ishibashi). The feature of this technique is that a sinusoidal voltage of a single frequency is applied to a ferroelectric liquid crystal or an antiferroelectric liquid crystal and the fundamental wave and the high harmonic components are measured and analyzed. With emphasis placed on the high harmonic components, the present inventors have conducted an experiment to extract the characteristics relating especially to the image sticking phenomenon.

A method of measuring the dielectric constant and the principle thereof will be explained in detail below.

Consider the waveform of an output voltage generated when an AC voltage is applied as an input voltage to a specimen. A method of evaluating the waveform of the output voltage consists in the temporal observation of the measurement and the observation in frequency domain. In these two methods, the time domain can be transformed into the frequency domain or the other way around by a predetermined transformation. The Fourier transformation is a well known scheme. The fast Fourier transform (FFT) is known for conducting this transformation with high rapidity.

The principle of this measurement of the dielectric constant will be explained below. Now, let $\epsilon$ be the dielectric constant, E be the electric field, and Ps be the spontaneous polarization. The electric flux density D is expressed by equation (1) below.

$$D = \epsilon E + Ps \qquad (1)$$

On the other hand, the electric flux density D is the charge q per unit area. Therefore, the dielectric constant $\epsilon$ can be determined by applying the electric field E to a dielectric material of a known area and measuring the capacitance C involved. Thus, the electric density D is expressed by equation (2) below using equation (1).

$$D = q = C \cdot V = \epsilon E + Ps \qquad (2)$$

From this, the dielectric constant $\epsilon$ can be expressed by equation (3) below.

$$\epsilon = q/E - Ps/E \qquad (3)$$

In the case of an antiferroelectric liquid crystal, the spontaneous polarization Ps is considered to assume a value infinitely proximate to zero for a small applied voltage, and therefore the second term of the right side of equation (3) is regarded as zero. From this, the dielectric constant $\epsilon$ is defined as the ratio between the electric field E and the charge q. In other words, the dielectric constant $\epsilon$ must be measured in the range of applied voltage in which this definition holds. The range of applied voltage in which the spontaneous polarization Ps is infinitely proximate to zero depends on the material of the antiferroelectric liquid crystal. In measuring the dielectric constant, therefore, the fact that the electric field E and the charge q are in the range maintaining a linear relation to each other is required to be ascertained for each material to be measured.

An item requiring consideration in the measurement using an AC electric field is a loss, i.e. a delay of an output signal (output voltage) relative to an input probe signal (input voltage). Generally, a polarization is induced when exerting an electric field on the polar molecules. Especially, since molecules rotate along the direction of an electric field, the polarization is given as the sum of newly-generated dipole moments and, when molecules rotate, various resistance are imposed due to conflicts with the surrounding molecules. Consequently, in the AC electric field, the polarization is delayed in phase by δ behind the electric field, thereby causing a power loss. This situation will be explained with reference to the drawings.

Figure 2:
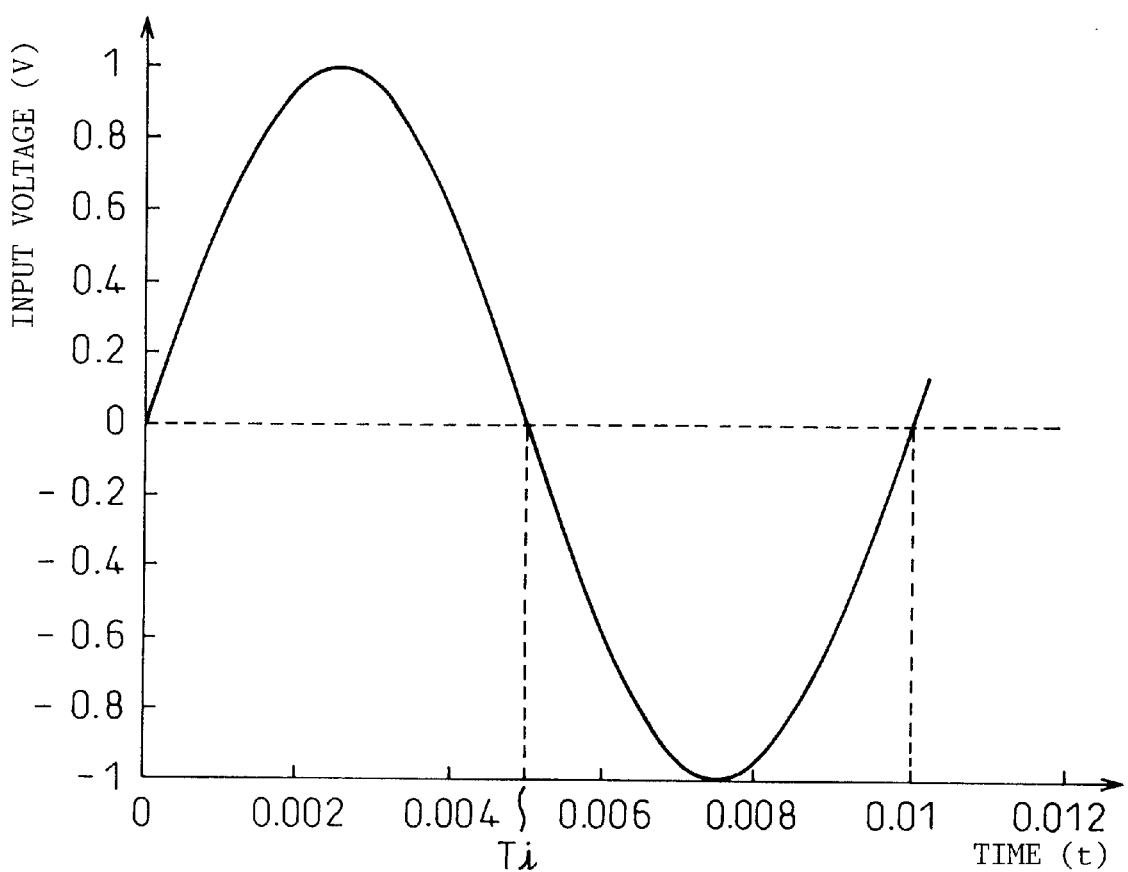
FIG. 2 is a waveform diagram showing a waveform of the input voltage applied to an antiferroelectric liquid crystal cell according to the invention.
Figure 3:
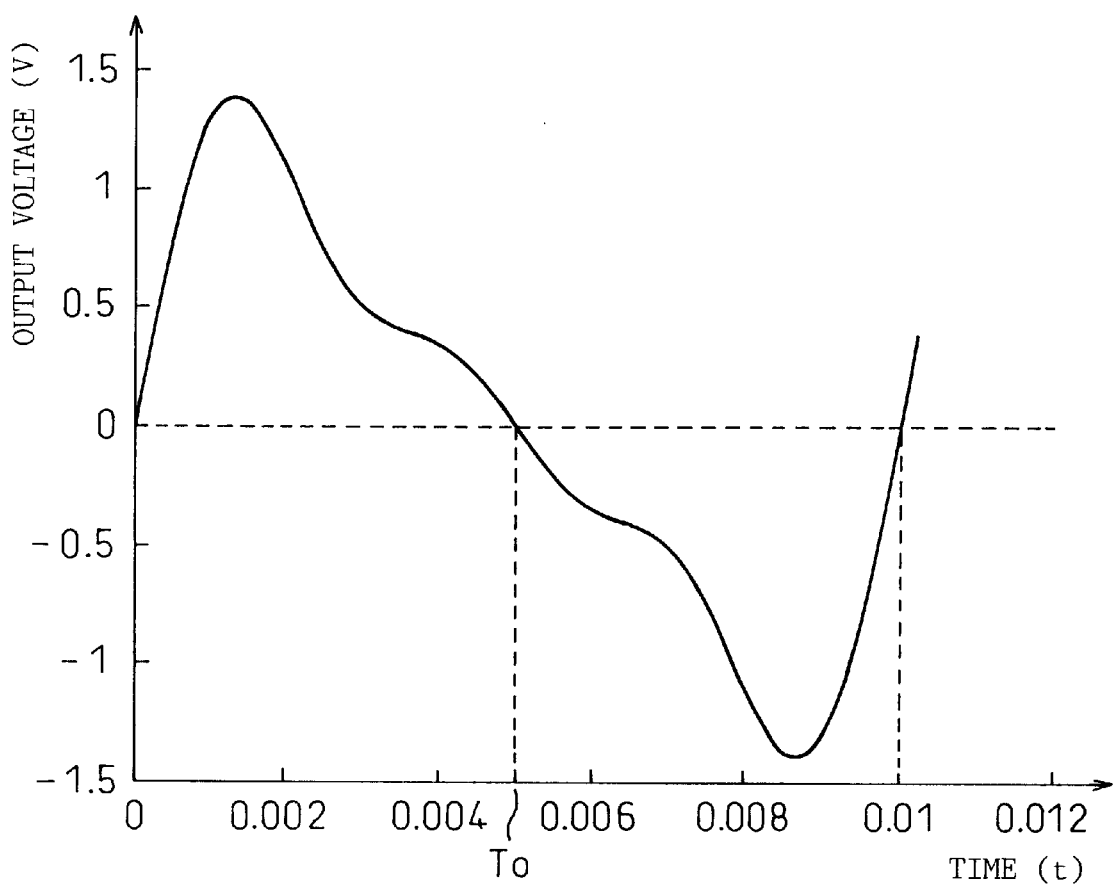
FIG. 3 is a waveform diagram showing the output waveform generated when the input waveform of FIG. 2 is applied to an antiferroelectric liquid crystal cell according to the invention.

FIG. 2 shows a waveform of an input voltage (sinusoidal waveform of drive frequency of 100 Hz) plotted along time axis. Also, FIG. 3 shows a waveform of an output voltage measured on the time axis with the input voltage shown in FIG. 2 applied to the specimen. The waveform of the output voltage of FIG. 3 at t=0 strictly follows the waveform of the input voltage of FIG. 2 at t=0, and the time To when the output voltage waveform crosses zero coincides with the time Ti when the input waveform crosses zero. In the waveform of the output voltage in actual measurement, however, a temporal delay occurs as described above. This delay is called a phase term or a loss term, and for expressing this phenomenon, a complex expression is used as is usually used in electric circuits. Specifically, the dielectric constant $\epsilon$ is expressed by equation (4) below, and the loss term is discussed including the imaginary term.

$$\epsilon = \epsilon' + i\epsilon'' \qquad (4)$$

In this equation, the real part $\epsilon'$ of the complex dielectric constant represents the AC dielectric constant, and the imaginary part $\epsilon''$ represents the dielectric loss. The ratio of the dielectric loss to the AC dielectric constant is expressed by the dielectric tangent (tanδ). The result of fast Fourier transform of the output voltage waveform is expressed by a complex number. The values of the real part and the imaginary part of this complex number can be used directly for expressing the real part $\epsilon'$ and the imaginary part $\epsilon''$ of the complex dielectric constant. Taking note of both the real part and the imaginary part, it is possible to obtain a graph indicating the frequency dependency of the real part $\epsilon'$ and the imaginary part $\epsilon''$ of the complex dielectric constant and a separate graph with the real part $\epsilon'$ plotted along the abscissa and the imaginary part $\epsilon''$ plotted along the ordinate. Especially, the diagram showing the relation ($\epsilon'$, $\epsilon''$) is known as a Cole—Cole plot diagram. Normally, the dielectric constant is evaluated using the frequency dependency (also called the frequency dispersion) on logarithmic scale and/or the Cole—Cole plot diagram on linear scale.

EMBODIMENTS

Figure 4:
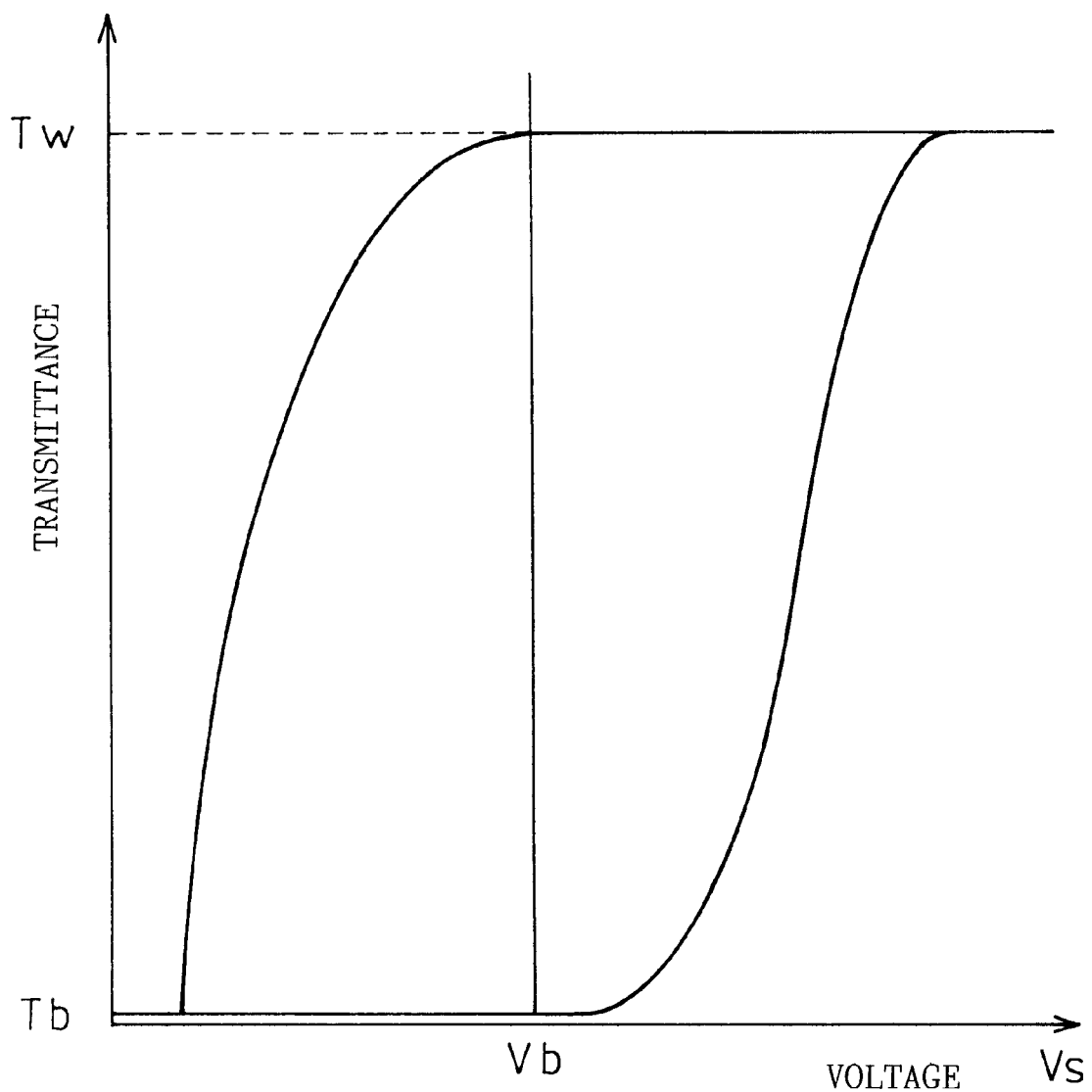
FIG. 4 is a diagram showing a voltage-transmission characteristic of a panel obtained when a voltage is applied to an antiferroelectric liquid crystal panel.

A method of measuring the panel characteristic of an antiferroelectric liquid crystal will be explained briefly with reference to FIG. 4. Upon application of a voltage to the antiferroelectric liquid crystal panel, the transmission characteristic of the panel exhibits a hysteresis as shown in FIG. 4 with the phase transition process (molecular realignment) of the antiferroelectric liquid crystal molecules. Especially, the panel characteristic in matrix drive is determined by a combination of the selective applied voltage Vs, the holding voltage Vb and the application time.

First, the contrast characteristic will be defined. The contrast characteristic is defined as the ratio between the transmittance Tw (white state) in the ferroelectric state with a sufficient voltage applied and the transmittance in the antiferroelectric state, i.e. the transmittance Tb (black state) with zero applied voltage. This ratio is one of the important characteristics for improving the visibility of the human being and is known to be better the larger it is.

Now, the response characteristic will be briefly explained. The response characteristic of the antiferroelectric liquid crystal includes the time tAF taken for the field induced phase transfer from the antiferroelectric phase (AF) to the ferroelectric phase (F) and the time tFA taken for the reverse transfer from the ferroelectric phase (F) to the antiferroelectric phase (AF). In this patent application, these two times tFA and tAF are taken note of. Especially, the optical characteristic and the white burn at the time of change from the ferroelectric phase (F) to antiferroelectric phase (AF) are layers of the glass substrate spin-coated with polyimide to a target thickness of 300×10–10 m are used as an alignment layer with the optical path length set to 100 nm to 800 nm. An optical path longer than 800 nm causes coloring of the display on the liquid crystal cell 4 and the need for a high drive voltage. A practically suitable optical path length, therefore, was in the range of 100 nm to 800 nm. The liquid crystal cell 4 was preheated to about 100° C., after which the antiferroelectric liquid crystal material was injected into the liquid crystal cell 4 using the vacuum injection technique.

Embodiment 1

A liquid crystal composed of the following compounds having the structures shown in the chemical formulae (1) to (4) was used as an antiferroelectric liquid crystal material injected into the liquid crystal cell 4.

By the way, in this case, an antiferroelectric liquid crystal was constructed by mixing 52.5 mol % of the compound expressed by the chemical formula (1), 22.5 mol % of the compound expressed by the chemical formula (2), 15 mol % of the compound expressed by the chemical formula (3) and 22.5 mol % of the compound expressed by the chemical formula (4), for example.

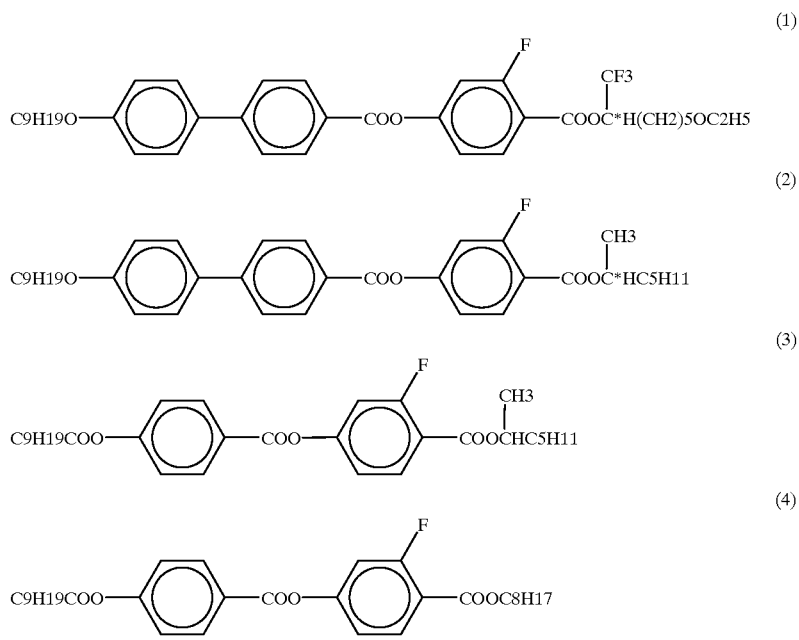

related to the optical characteristic and the black burn at the time of change from antiferroelectric phase (AF) to ferroelectric phase (F), and the correlation between the burn and the response characteristic was studied in detail.

Figure 5:
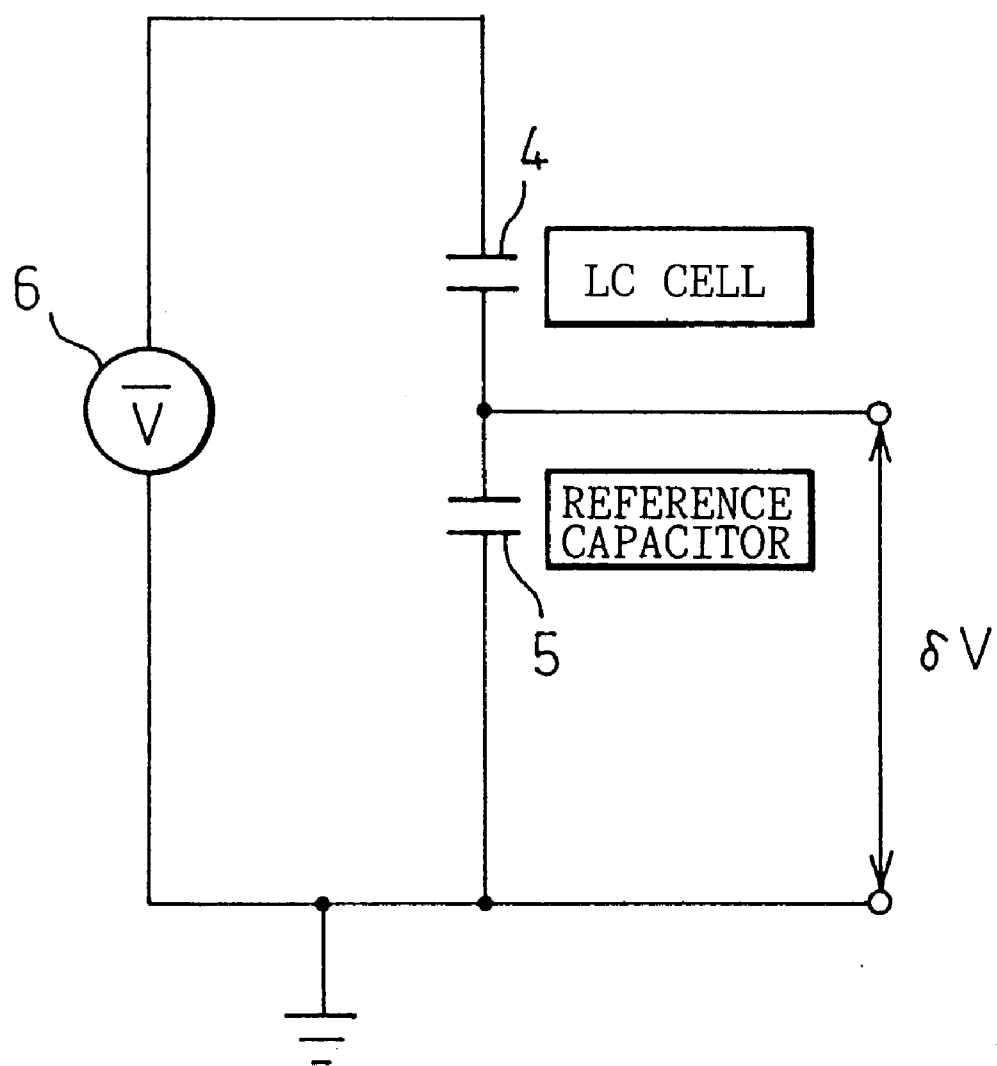
FIG. 5 is a circuit diagram showing an experimental circuit used in an embodiment of the present invention.

In order to measure the fundamental wave and the high harmonic components of the output voltage detected upon application of a sinusoidal voltage of a single frequency, a circuit as shown in FIG. 5 was prepared. In this circuit, a liquid crystal cell 4 is connected in series to a capacitor 5 having a reference capacity Cref, and this series circuit is connected to an AC voltage source 6. An end of the capacitor 5 is grounded and the voltage across the capacitor 5 was measured.

The basic configuration of the liquid crystal cell 4 used in FIG. 5 is the same as that of the antiferroelectric liquid crystal cell 3 described with reference to FIG. 1. The substrate will be described in more detail. In FIG. 5, two The gap length of the liquid crystal cell 4 is controlled to 1.7 to 1.9 μm, and the optical light path length is set to about 220 nm. After that, the liquid crystal cell 4 was arranged as shown in FIG. 5, and the dielectric constant was measured. Specifically, a minor voltage δV appearing across the capacitor 5 was detected. Especially, the standard capacity Cref of the capacitor 5 was set at 500 to 1000 times as high as the value of the capacity Clc of the liquid crystal cell 4 in such a manner that substantially the whole applied voltage was impressed on the liquid crystal layer of the liquid crystal cell 4. In the process, the charge Δq flowing into the liquid crystal cell 4 can be calculated as $$\Delta q = \delta \cdot V \cdot Cref$$

The liquid crystal cell 4 was supplied with a sinusoidal voltage with a constant peak voltage from the AC voltage source 6, and while changing the reference frequency of the sinusoidal voltage sequentially, the change of the influent charge Δq was measured.

The output voltage obtained for one period in this case was subjected to Fourier transform as described above, so that the components of the fundamental wave and the high harmonic waves were analyzed from the real part (the real part $\epsilon'$ of the complex dielectric constant) and the imaginary part (the imaginary part $\epsilon''$ of the complex dielectric constant) of the complex number obtained.

Figure 6A:
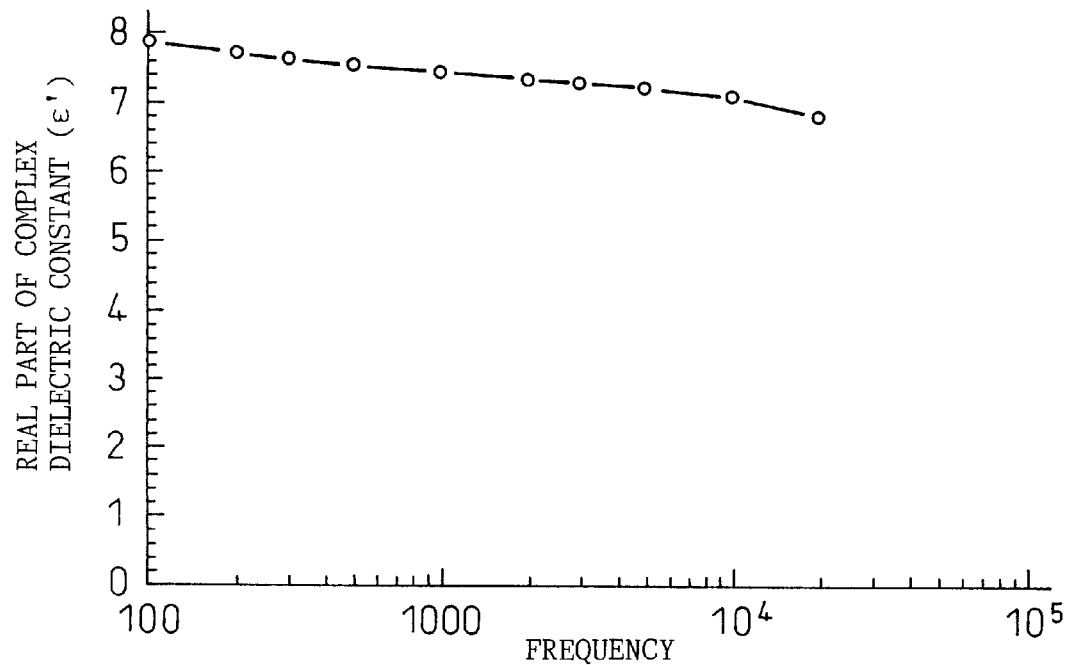
FIG. 6A is a diagram showing the frequency dependency of the real part of the complex dielectric constant obtained in an embodiment of the invention.
Figure 6B:
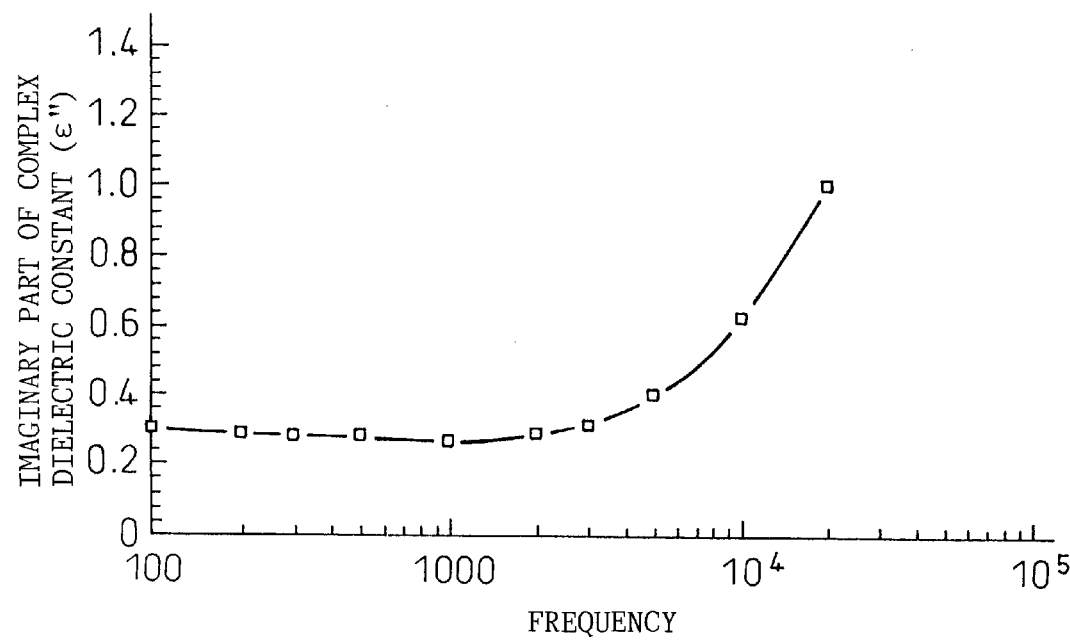
FIG. 6B is a diagram showing the frequency dependency of the imaginary part of the complex dielectric constant obtained in an embodiment of the invention.

Then, taking note of both the real part $\epsilon'$ and the imaginary part $\epsilon''$ of the complex dielectric constant, the characteristic of these values was examined with the frequency along the abscissa. FIG. 6A shows the frequency dependency of the real part $\epsilon'$ of the complex dielectric constant, and FIG. 6B the frequency dependency of the imaginary part $\epsilon''$ of the complex dielectric constant. ○ in FIG. 6A designates the frequency dependency of the real part $\epsilon'$, and □ in FIG. 6B designates the imaginary part $\epsilon''$. Taking note of the frequency characteristic of the imaginary part $\epsilon''$ of the complex dielectric constant in FIG. 6B, the imaginary part $\epsilon''$ of the complex dielectric constant undergoes a change at a substantially predetermined rate within the reference frequency range of 100 Hz to 5 kHz. In more detail, however, it is found to form a curve with the frequency of 1 kHz as a minimum.

Then, a Cole—Cole plot is prepared with the real part $\epsilon'$ plotted along the abscissa and the imaginary part $\epsilon''$ along the ordinate in FIG. 6A. The characteristic as shown in FIG. 7 was obtained. Take note of the value of the reference frequency from 100 Hz to 5 kHz. This characteristic is found to assume a substantially flat curve free of a local maximum. When this liquid crystal cell 4 was driven for display as an antiferroelectric liquid crystal panel, a superior display was obtained without the image sticking phenomenon.

Reference

As in the first embodiment, the liquid crystal cell 4 was prepared and the dielectric constant was measured using the circuit of FIG. 5. An antiferroelectric liquid crystal material having a structure as shown below different from the first embodiment was used for injection into the liquid crystal cell 4.

Figure 8A:
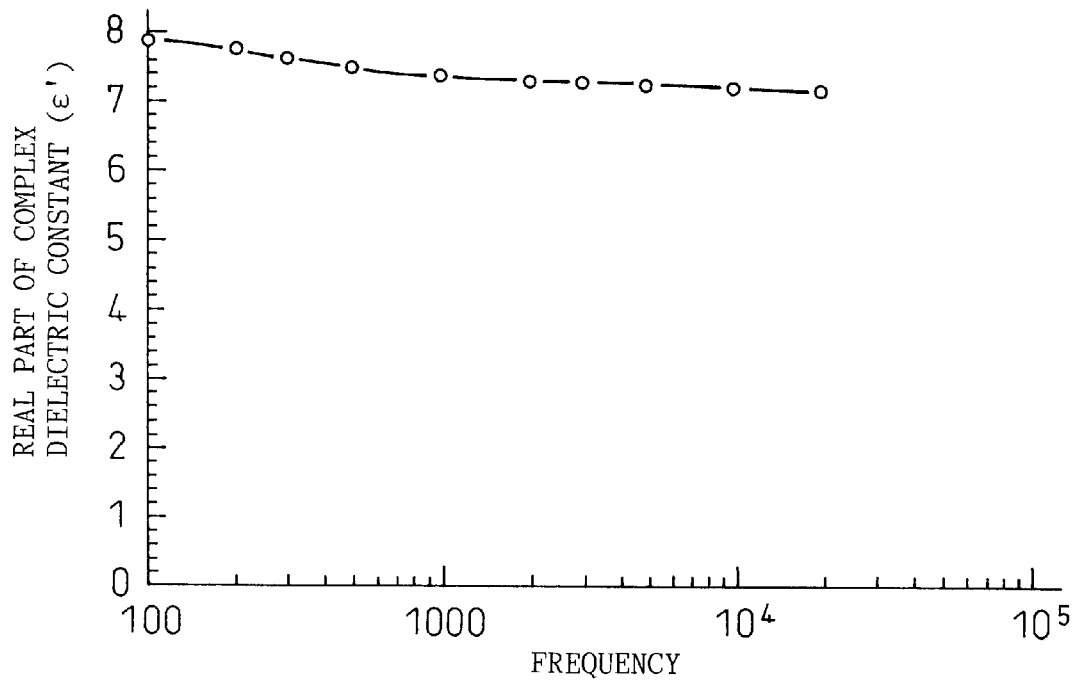
FIG. 8A is a diagram showing the frequency dependency of the real part of the complex dielectric constant obtained by a reference not associated with the present invention.
Figure 8B:
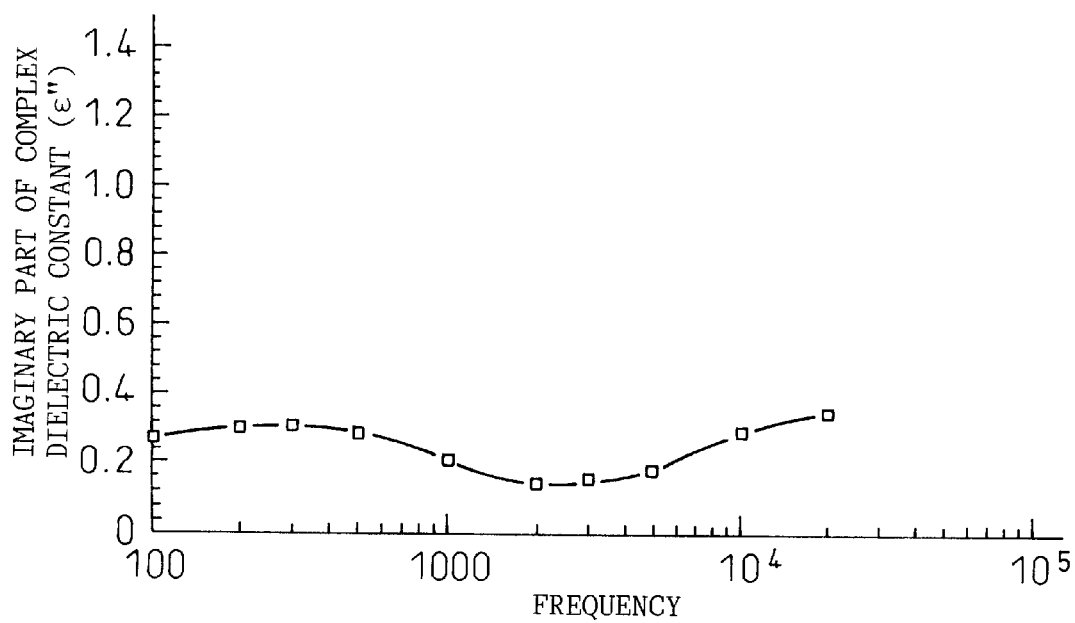
FIG. 8B is a diagram showing the frequency dependency of the imaginary part of the complex dielectric constant obtained by a reference not associated with the present invention.

○ in FIG. 8A designates the frequency dependency of the real part $\epsilon'$, and □ in FIG. 8B designates the imaginary part $\epsilon''$. Taking note of the frequency dependency of the imaginary part $\epsilon''$ of the complex dielectric constant in FIG. 8B, the imaginary part $\epsilon''$ of the complex dielectric constant is found to assume a curve having a local maximum value and a local minimum value in the reference frequency range of 100 Hz to 5 kHz.

Next, by preparing a Cole—Cole plot with the real part $\epsilon'$ along the abscissa and the imaginary part $\epsilon''$ along the ordinate in FIG. 8A, the characteristic shown in FIG. 9 was obtained. Taking note of the value of the reference frequency of 100 Hz to 5 kHz in the drawing, the characteristic is found to assume a curve having a local maximum value in the neighborhood of 300 Hz. When this liquid crystal cell 4 was driven for display as an antiferroelectric liquid crystal panel, an image sticking phenomenon occurred and the display quality was not satisfactory.

Figure 10:
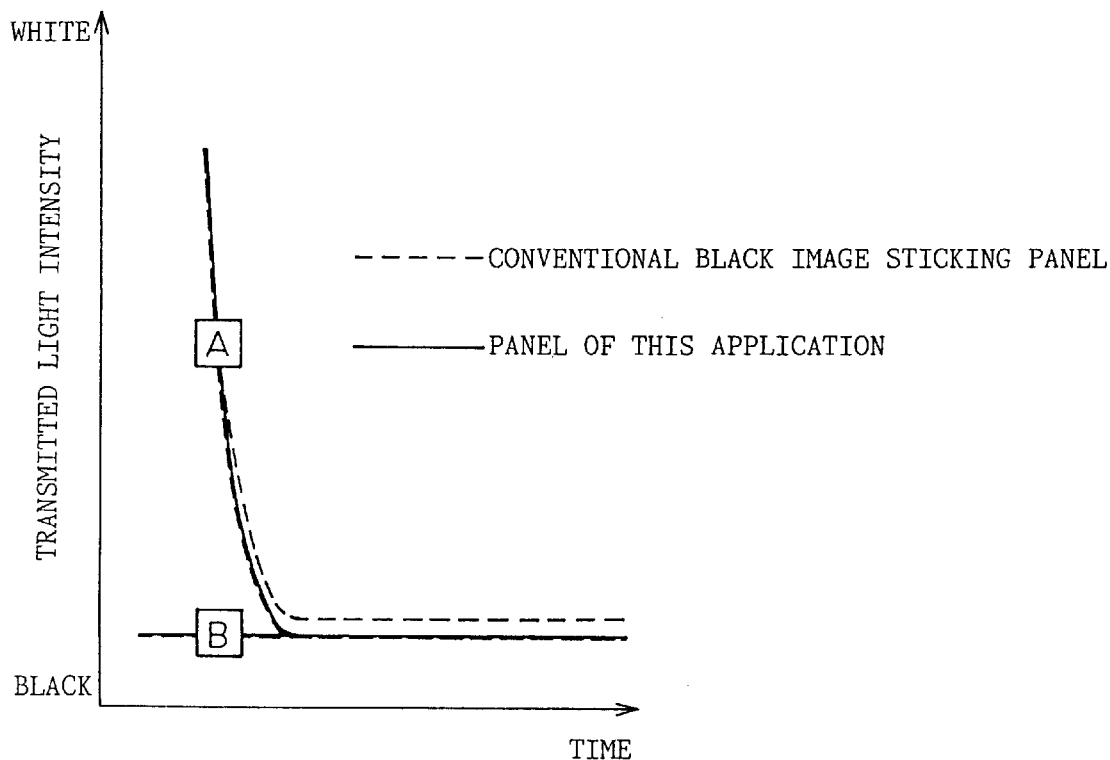
FIG. 10 is a diagram showing a comparison of the black image sticking states of the liquid crystal display panels prepared using the antiferroelectric liquid crystal cells according to the first embodiment of the invention and a reference.

FIG. 10 shows the result of an experiment conducted for evaluating the image sticking phenomenon of the liquid crystal display panel prepared using antiferroelectric liquid crystal cells according to the first embodiment and a reference. In this experiment, first, white was written in each of the liquid crystal display panels prepared using the antiferroelectric liquid crystal cells according to the first embodiment and the reference. Then, the change A of the intensity of the transmitted light with black written in and the temporal change B of the intensity of the transmitted light after black was written were determined and plotted.

The characteristic indicated by solid line in FIG. 10 represents the transmitted light intensity characteristic for the liquid crystal display panel using the antiferroelectric liquid crystal panel according to the first embodiment of the invention, and the characteristic designated by dashed line represents the transmitted light intensity characteristic for the liquid crystal display panel using the antiferroelectric liquid crystal cell according to the reference.

As seen from the characteristic indicated by a dashed line, with a liquid crystal display panel using the antiferroelectric liquid crystal cell of the reference, the black transmittance is different between the change A and the change B, resulting in a different black state. In the liquid crystal display panel using the antiferroelectric liquid crystal panel according to

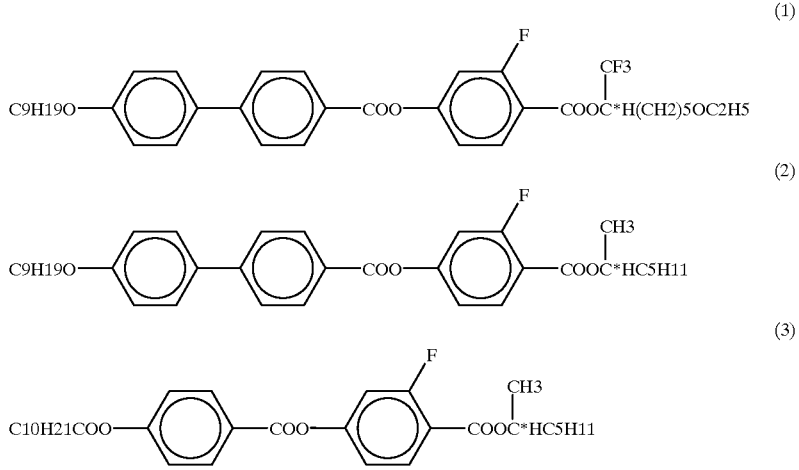

The measurement was taken while changing the reference frequency as in the first embodiment. FIG. 8A shows the frequency dependency of the real part $\epsilon'$ of the complex dielectric constant, and FIG. 8B the frequency dependency of the imaginary part $\epsilon''$ of the complex dielectric constant.

the first embodiment of the invention, in contrast, the black transmittance is the same for the change A and the change B. Specifically, it is seen that the use of the antiferroelectric liquid crystal material according to the first embodiment of the invention can finally settle in the same black state regardless of whether the state before writing black is black or white. Thus, the image sticking is avoided.

Embodiment 2

Figure 11:
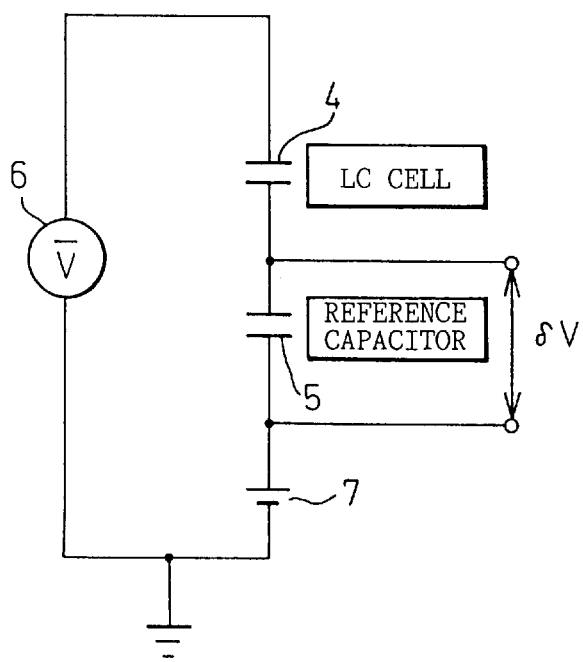
FIG. 11 is a circuit diagram showing an experimental circuit used in another embodiment of the present invention.

FIG. 11 is a circuit diagram showing an experimental circuit used according to another embodiment of the present invention. In the first embodiment, the sinusoidal voltage of a single frequency free of DC bias was applied to the liquid crystal cell 4 and, in order to measure the fundamental wave and the high harmonic components detected in the process, the circuit as shown in FIG. 5 was prepared. In the experimental circuit of the second embodiment, in contrast, a capacitor 5 having a reference capacitance Cref is connected in series with the liquid crystal cell 4 and further connected to a DC power supply 7 so that a bias voltage is applied to the capacitor 5 the DC power supply 7. This bias voltage is not more than one fifth of about 20 V providing a DC threshold of the liquid crystal cell 4, i.e. not more than 4 V. In this case, it is a bias voltage of 1 V. This series circuit is connected to an AC voltage source 6 on the one hand and the negative side of the DC power supply 7 is grounded on the other hand. Then, the voltage $\delta V$ across the capacitor 5 was measured.

By the way, the basic configuration of the liquid crystal cell 4 used in FIG. 11 is the same as that of the antiferroelectric liquid crystal cell 3 described with reference to FIG. 1, and the antiferroelectric liquid crystal material was injected into the preheated liquid crystal cell 4 using the vacuum injection technique.

Using this circuit of FIG. 11, like in the first embodiment, the minor voltage $\delta V$ appearing across the capacitor 5 was detected to measure the dielectric constant. Specifically, with a bias voltage of 1 V applied to the capacitor 5, the liquid crystal cell 4 is impressed with a sinusoidal voltage with a constant peak voltage from the AC power supply 6, and while the reference frequency of the sinusoidal voltage is changed sequentially, the change in the influent charge $\Delta q$ involved was measured.

The resulting output voltage for one period was subjected to Fourier transformation as described above, and the components of the fundamental wave and the high harmonics were analyzed from the real part (the real part $\epsilon'$ of the complex dielectric constant) and the imaginary part (the imaginary part $\epsilon''$ of the complex dielectric constant) of the complex number thus obtained.

Figure 12:
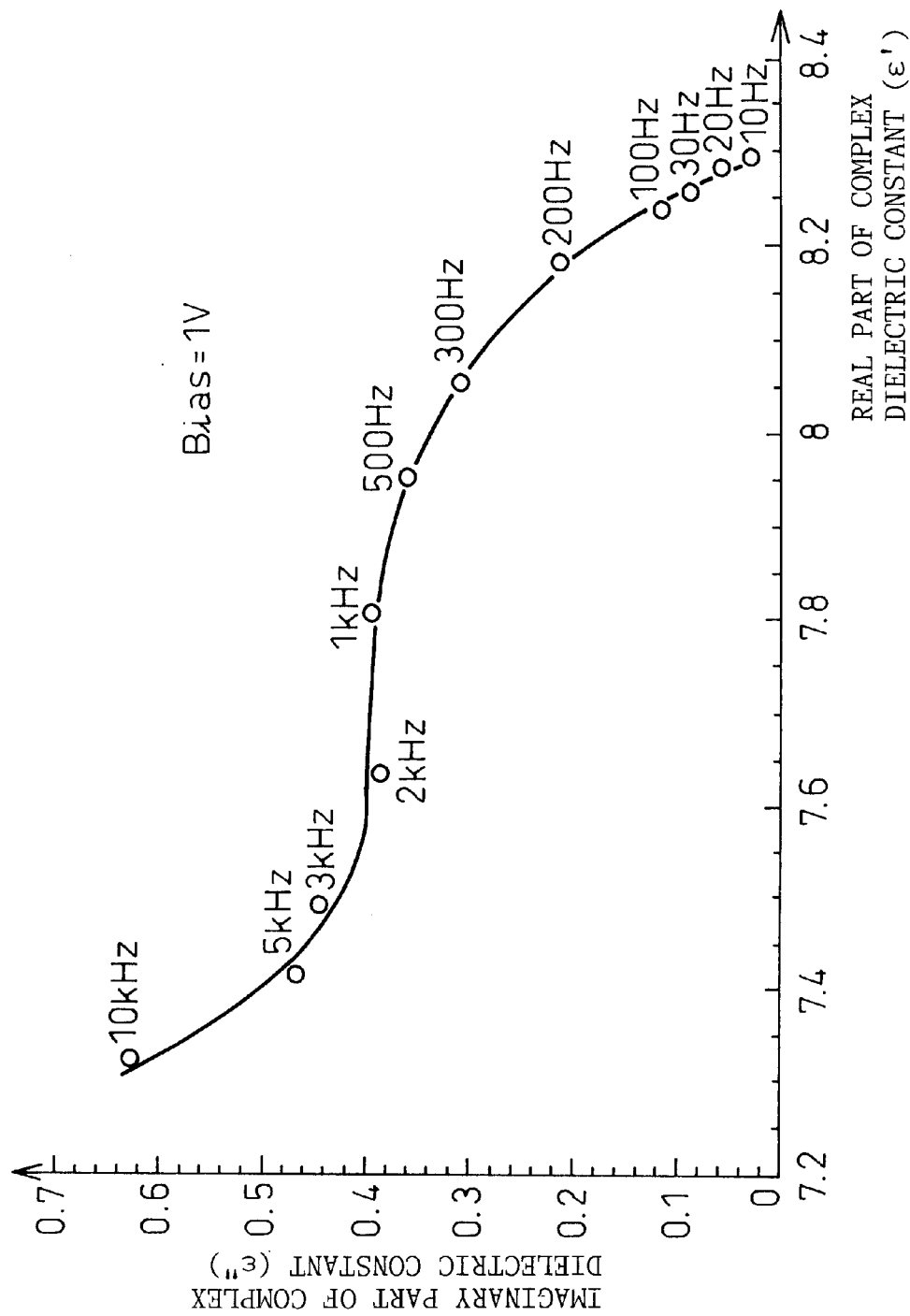
FIG. 12 is a Cole—Cole plot diagram corresponding to the frequency of the real part and the imaginary part of the complex dielectric constant obtained in the embodiment of FIG. 11 according to the invention.

Then, taking note of both the real part $\epsilon'$ and the imaginary part $\epsilon''$ of the complex dielectric constant, the characteristic of these values was studied with the frequency along the ordinate. The frequency dependency of the real part $\epsilon'$ and the imaginary part $\epsilon''$ of the complex dielectric constant were determined, and the Cole—Cole plot was prepared with the real part $\epsilon'$ plotted along the abscissa and the imaginary part $\epsilon''$ along the ordinate. The characteristic as shown in FIG. 12 was obtained.

The value of the reference frequency in the range of 500 Hz to 5 kHz, in the drawing, shows that the frequency dependency in this range has a flat portion. Regarding the value of the reference frequency in the range of not more than 100 Hz in the drawing, on the other hand, it can be seen that the frequency dependency in this range has no local minimum value.

This liquid crystal cell 4 is driven for display as an antiferroelectric liquid crystal panel. A satisfactory display free of the image sticking phenomenon was obtained.

Reference

A liquid crystal cell 4 was prepared as the same reference as for the first embodiment, and the dielectric constant was measured using the circuit of FIG. 11. The measurement was take while changing the reference frequency as in the second embodiment.

Figure 13:
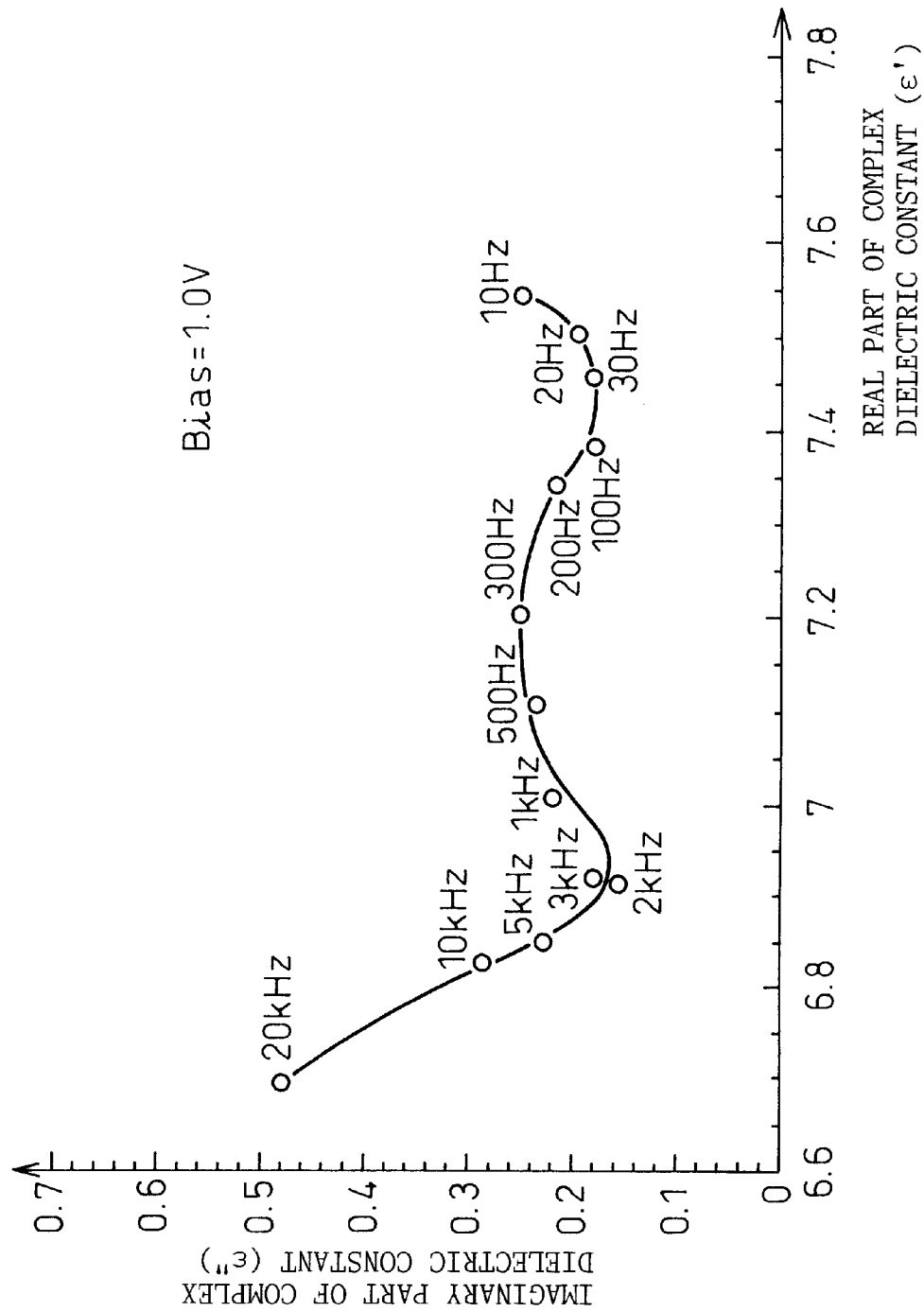
FIG. 13 is a Cole—Cole plot diagram corresponding to the frequency of the real part and the imaginary part of the complex dielectric constant obtained from a reference not associated with the invention.

Like in the second embodiment, the characteristic of the values of both the real part $\epsilon'$ and the imaginary part $\epsilon''$ of the complex dielectric constant was examined with the frequency along the abscissa. Then, the frequency dependency of the real part $\epsilon'$ and the imaginary part $\epsilon''$ of the complex dielectric constant was determined, and a Cole—Cole plot was prepared with the real part $\epsilon'$ along the abscissa and the imaginary part $\epsilon''$ along the ordinate as in the second embodiment. The characteristic as shown in FIG. 13 was obtained.

The value in the reference frequency range of 100 Hz to 5 kHz shows that the frequency dependency in this range assumes a curve having a local maximum value at about 300 Hz. On the other hand, the value of the reference frequency of not more than 100 Hz in the drawing shows that the frequency dependency in this range has a local minimum value at about 30 Hz.

When the liquid crystal cell 4 in this reference was driven for display as an antiferroelectric liquid crystal panel, an image sticking phenomenon occurred. The display quality therefore was not considered superior.

INDUSTRIAL APPLICABILITY

As described above, by preparing an antiferroelectric liquid crystal cell using an antiferroelectric liquid crystal material according to this invention, the following advantages are obtained in both antiferroelectric phase and ferroelectric phase.

(1) The image sticking phenomenon can be prevented.
(2) The high-speed response characteristic can be held as it is.
(3) The feature of wide viewing angle can be held as it is.
(4) The high contrast characteristic can be held as it is.

According to the present invention, therefore, an antiferroelectric liquid crystal cell is provided which has a high-speed response and a wide viewing angle characteristic free of the image sticking phenomenon.

What is claimed is:

1. An antiferroelectric liquid crystal cell comprising an antiferroelectric liquid crystal material held between a pair of substrates, wherein said antiferroelectric liquid crystal material has a dielectric constant such that, when a sinusoidal voltage value changing in reference frequency in a range of from 100 Hz to 5 kHz is applied to said antiferroelectric liquid crystal cell, an output voltage from the antiferroelectric crystal cell by the application of the sinusoidal voltage value in each frequency is transformed by a Fourier transform, crystal cell, and the imaginary part of the complex dielectric constant obtained by the Fourier transform of the output voltage value from said antiferroelectric liquid crystal cell is plotted within the reference frequency range of 100 Hz to 5 kHz to provide a plotted characteristic of said antiferroelectric liquid crystal cell, said plotted characteristic has no local maximum value within the reference frequency range of 100 Hz to 5 kHz.

2. An antiferroelectric liquid crystal cell as described in claim 1, wherein said characteristic is such that when the real part and the imaginary part of said complex dielectric constant are plotted by using a Cole—Cole plot for each frequency, said characteristic curve has no local maximum value in the reference frequency range of 100 Hz to 5 kHz.

3. An antiferroelectric liquid crystal cell as described in claim 1 or 2, wherein said antiferroelectric liquid crystal uses an antiferroelectric liquid crystal material comprising a mixture of the compounds represented by the following chemical formulae (1), (2), (3) and (4);

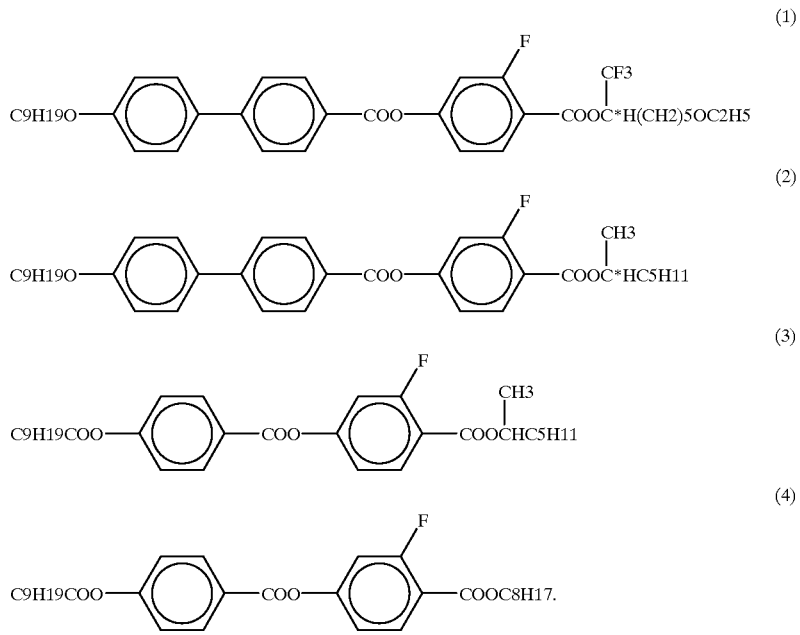
4. An antiferroelectric liquid crystal cell as described in claim 3, wherein said antiferroelectric liquid crystal is composed of a mixture of 52.5 mol % of the compound expressed by (1) above, 22.5 mol % of the compound expressed by (2) above, 15 mol % of the compound expressed by (3) above, and 22.5 mol % of the compound expressed by (4) above.
* * * * *

UNITED STATES PATENT AND TRADEMARK OFFICE
CERTIFICATE OF CORRECTION

PATENT NO. : 6,151,095

DATED: November 21, 2000

INVENTORS: Yasushi SUZUKI et al.

It is hereby certified that errors appear in the above-identified patent and that said Letters Patent is hereby corrected as shown below:

Claim 1, col. 12, line 49, after "transform," delete "crystal cell,".

Signed and Sealed this

First Day of May, 2001

Attest:

NICHOLAS P. GODICI

*Attesting Officer*   *Acting Director of the United States Patent and Trademark Office*